United States Patent Office 3,485,328
Patented Dec. 23, 1969

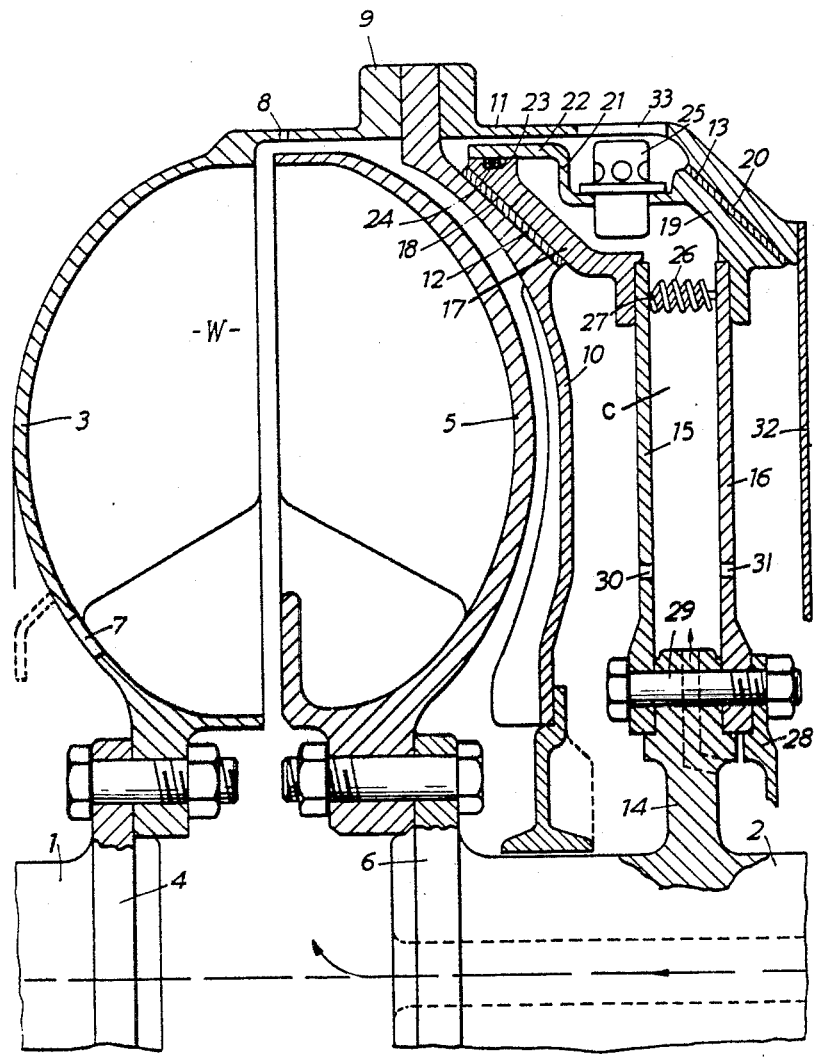

3,485,328
FLUID COUPLING WITH CENTRIFUGAL FLUID LOCK UP CLUTCH
John Bilton, Hampton, England, assignor to Fluidrive Engineering Company Limited, Isleworth, Middlesex, England
Filed Dec. 18, 1967, Ser. No. 691,659
Claims priority, application Great Britain, Dec. 29, 1966, 58,188/66
Int. Cl. F16d 35/00
U.S. Cl. 192—3.3                                4 Claims

ABSTRACT OF THE DISCLOSURE

In a hydraulic turbo-coupling incorporating a friction clutch which takes over the drive under full speed driving conditions, the friction clutch includes a clutch plate which is deformable under the centrifugal fluid pressure head set up in an annular clutch operating chamber. The clutch plate is resiliently biased to its disengaged position by its own resilience and/or additional springs. At full working speed, the centrifugal pressure within the annular chamber deforms the clutch plate against the resilient bias into full engagement.

---

The present invention relates to hydraulic turbo-couplings incorporating clutches. In such couplings, the clutch serves to provide a direct drive between the input and output elements of the coupling, thereby effectively by-passing the working circuit of the coupling.

According to the present invention there is provided a hydraulic turbo-coupling incorporating a clutch and comprising co-axially mounted vaned impeller and runner elements together defining a toroidal working circuit for the working liquid of the coupling and a friction clutch for clutching together the impeller and runner elements, wherein the friction clutch includes a clutch plate which forms a boundary wall of an annular clutch operating chamber and in that the clutch plate is deformable against a resilient bias under the centrifugal head within the chamber to engage the friction clutch at least at full speed.

Although the resilient bias may be provided by the inherent resilience of the annular plate, it is preferred that the annular plate in its unstressed condition should lie halfway between the positions which it occupies in the fully engaged and fully disengaged positions of the clutch and that the resilient bias should be applied to the annular plate, preferably with abutments to prevent movement beyond the disengaged position.

For most applications it is required that the clutch should engage only at the upper working speeds of the coupling so as to avoid normal slip losses in the coupling, typically of the order of 3% under normal driving conditions. If the coupling speed drops, as a result for example of a sudden increase in load or of a reduction in the driving torque available from the prime mover, it is desirable that the clutch should disengage so that the torque transmitted by the coupling will then be transmitted by the working circuit. To achieve this, it is preferred that the clutch operating chamber should include at least one quick-emptying valve at its outer periphery to enable the clutch operating chamber to be rapidly emptied. The quick-emptying valve may be of the automatic type operated by a reduction in the centrifugal force acting on a control member as shown for example in United States Patent No. 1,873,688. Alternatively, the quick-emptying valve may be of the diaphragm type controlled by an oil pipe feed system as described in British patent specification No. 470,056.

The annular clutch operating chamber can be bounded on both sides by deformable annular plates each supporting a friction surface which co-operates with a corresponding friction surface, the said corresponding friction surfaces being carried by the other half of the coupling. The radially outer wall of the annular chamber preferably carrying the quick-emptying valve may be mounted on one of the annular plates, the annular chamber including a sliding seal to permit relative movement of the annular plates and their friction surfaces towards and away from each other without loss of liquid from the chamber.

The coupling construction described above is particularly suitable for use in marine propulsion systems driven by high power diesel engines of the multi-cylinder especially of the multi-bank type, e.g. V type. Typical examples are fast cargo liners and fast bulk carriers which are vessels which would be expected to travel for long distances at full speed and full power. Under these conditions it would be obvious that an appreciable saving in the running costs of the ship can be effected by eliminating the slip losses in the working circuits of hydraulic turbo-couplings. On the other hand it is generally desirable to incorporate a fluid coupling in the drive from a marine diesel engine to the propeller shaft, particularly where this drive includes reduction gearing, so as to provide flexibility particularly in shielding the gearing from the torsional oscillations of the engine crankshaft. Particularly with engines of the multicylinder V lay-out, it is possible to ensure by prior calculation that the torsional oscillations of the engine crankshaft are minimal at full engine speed. By arranging that the clutch engages only as this speed is approached and by arranging that the clutch disengages as soon as the engine speed drops appreciably below full speed, the double advantage is obtained that the full speed drive is slip free and thus efficient, the torsional oscillations being then minimal while at lower engine speeds, whether caused by faulty engine running or the need for speed reduction, the gear system is shielded from the torsional oscillation of the engine crankshaft by the working circuit of the coupling.

Such an arrangement also enables the dimensions of the coupling working circuit to be reduced since a higher value of the slip can be tolerated, bearing in mind that the working circuit does not have to transmit torque during normal full speed running. Such reduction by virtue of the increased softness of the coupling is advantageous to the transmission in general.

Couplings embodying the present invention may also be used for a wide variety of other uses particularly where it is desired to eliminate the coupling slip under normal operation and the consequent necessity for cooling the working liquid normally by circulating it from the working circuit through an external cooler and return it to the working circuit. In one such example a squirrel-cage electric motor is employed to drive a long belt conveyor. To start up the conveyor belt, the motor is first run up to speed with the coupling emptied, the working circuit of a coupling is then gradually filled at a rate which ensures that the tension applied to the belt is kept to an acceptably low value until the conveyor belt is brought up almost to full speed. The friction clutch is then engaged and the motor drive is then transmitted directly through it.

While the clutch is engaged the working circuit of the coupling may be kept full as a standby in case of clutch failure.

An embodiment of the invention will now be described by way of example with reference to the accompanying drawing in which the single figure is a diagrammatic longitudinal sectional view of a hydraulic turbo-coupling incorporating a clutch.

The coupling shown in the drawing establishes a driving connection between an input shaft 1 and an output shaft 2. The coupling comprises a vaned impeller element 3 bolted to a flange 4 on the shaft 1 and a vaned runner element 5 bolted to a flange 6 on the end of the output shaft 2. The impeller and runner elements 3 and 5 together define a toroidal working circuit W to which oil is supplied through ports 7 in the radially inner part of the impeller and from which the oil can escape at a predetermined rate through leak-off nozzles 8 at the radially outer periphery of the impeller 3.

Bolted to a flange 9 on the impeller 3 is a coupling casing 10 and a clutch casing 11. The two casings 10 and 11 carry conical clutch surfaces 12 and 13. The coupling casing 10 extends around the back of the runner 5 so as to prevent the escape of oil from the working circuit W other than from the leak-off nozzles 8.

The output shaft 2 carries a second flange 14 spaced from the flange 6. Bolted to the flange 14 are a pair of flexible annular torque transmitting clutch plates 15 and 16. Secured to the radially outer portion of the plate 15 is a clutch member 17 carrying a clutch lining 18 arranged to co-operate with the clutch surface 12.

Secured to the radially outer portion of the annular plate 16 is a clutch member 19 carrying a clutch facing 20 of frictional material to co-operate with the clutch surface 13. The clutch member 19 carries an extension 21 which forms a radially outer peripheral wall for an annular clutch operating chamber C bounded by the plates 15 and 16 and the clutch members 17 and 19. The extension 21 terminates in a cylindrical portion 22 in which the outer periphery of the clutch member 17 is slidable, the latter being formed with a groove 23 to accommodate a sealing ring 24. Mounted in the extension 21 of the clutch member 19 are automatically operating quick-emptying valves 25 of the type disclosed in U.S. Patent No. 1,837,688. The valves 25 remain open until the speed of the shaft 2 reaches a value close to its normal full working speed.

The clutch members 17 and 19 are resiliently biased towards each other so as to disengage the clutch facings 18 and 20 from the surfaces 12 and 13 by springs 26. In the unstressed condition each plate 15, 16 would hold its associated clutch member 17, 19 in the position half-way between the fully engaged position and the fully disengaged position of the clutch members 17 and 19. To prevent the clutch members 17 and 19 moving towards each other beyond the fully disengaged position under the action of the springs 26, each plate 15, 16 carries abutments 27 extending within the springs 26.

The chamber C is supplied with oil from a collector ring 28 secured to the flange 14. The collector ring 28 defines a weir from which oil is fed into the chamber C through a radial passageway 29 in the flange 14, the collector ring 28 being supplied with oil from a stationary nozzle (not shown). The plates 15 and 16 are drilled at 30, 31 to define the radially inner limit of the body of oil which can be held in the chamber C. The coupling casing 11 carries an end cover 32 which channels the oil escaping from the holes 31 to flow through grooves in the clutch facing 20 to apertures 33 in the clutch casing 11 which register with the quick-emptying valves 25. The clutch facing 18 is similarly grooved to permit the escape of oil from the holes 30 to the apertures 33.

In operation, the motor or engine driving the shaft 1 is started up and oil for the working circuit W is supplied either through the port 7 or if desired along the interior of one of the shafts 1, 2 to the gap between the impeller and runner elements 3 and 5. When the working circuit W is full and the engine or motor has brought the shaft 2 and its connected load almost up to full speed, so that for example the coupling slip is of the order of 5%, the clutch is engaged. The collector ring may either be continuously supplied with oil as soon as the shaft 1 is set in motion or alternatively it may only be supplied with oil when the runner 5 approaches full speed. In either case, when the runner speed is less than a predetermined value set by the quick-emptying valves 25, the latter remain open thereby preventing the chamber C from filling. When however the runner speed reaches the predetermined value, the valves 25 close and the chamber C begins to fill with oil. The centrifugal pressure and the radial depth of oil in the chamber C then increase progressively and urge the clutch members 17 and 19 to move apart axially against the action of the springs 26 so as to engage the clutch facings 18 and 20 with their co-operating clutch surfaces 12 and 13. The friction clutch is thus progressively engaged until the runner speed is brought up to the impeller speed. When the chamber C is full the oil supplied to the collector ring 28 overflows through the holes 30 and 31 and escapes through the apertures 33.

If the speed of the output shaft 2 should drop for any reason due for example to misfiring of one or more cylinders in an engine driving shaft 1, the quick-emptying valves 25 will open to discharge the contents of the chamber C through the apertures 33. The springs 26 will then move the clutch members 17 and 19 to their disengaged positions as determined by the abutments 27. The only driving connection between the shafts 1 and 2 will then be through the working circuit W thereby shielding any gearing in the load driven by the output shaft 2 from any torsional oscillations of the input shaft 1.

In the instances where the quick-emptying valve or valves are of the diaphragm type, then their operation may be determined either by the admission of oil to the chamber C, or by oil flow along a separate control oil tube.

In the latter case, the main oil supply can be left permanently flowing into the chamber C, and the control oil switched either manually or by a suitable automatic governor system.

I claim:

1. A hydraulic turbo-coupling of the kind incorporating a clutch, comprising coaxially mounted vaned impeller and runner elements together defining a toroidal working circuit for the working liquid of the coupling and a friction clutch means including a clutch plate for clutching together the impeller and runner elements, in which said clutch means includes an annular hydraulic clutch operating chamber having a radially outer wall with said clutch plate forming a boundary wall of said annular clutch operating chamber, said clutch plate being resiliently deformable due to the centrifugal head generated within said chamber to engage said friction clutch means at least at full speed, said clutch plate in its unstressed condition lying partway between the positions which it occupies respectively in the fully engaged and fully disengaged conditions of the clutch means, resilient means biasing said clutch plate toward the fully disengaged condition of the clutch means, and said clutch means including means for supplying liquid to said chamber at a pressure insufficient to engage said clutch means below a predetermined angular speed.

2. A coupling and clutch according to claim 1, in which said annular clutch operating chamber is bounded by a second annular clutch plate on the side opposite to the first-mentioned clutch plate and the radially outer wall of said chamber is carried by one of said clutch plates with a seal between said radially outer wall and the other of said clutch plates.

3. A coupling and clutch combination according to claim 1, in which said annular clutch operating chamber includes at least one quick-emptying valve adapted to automatically remain open below a predetermined angular speed.

4. A coupling and clutch combination according to claim 1, in which said clutch plate has an aperture therethrough to define, during operation, a radially inner boundary for an annular body of liquid contained in said chamber.

(References on following page)

References Cited

UNITED STATES PATENTS

| | | | |
|---|---|---|---|
| 796,989 | 8/1905 | Enrico | 192—87.19 |
| 2,045,615 | 6/1936 | Rosle et al. | 192—3.29 |
| 2,404,657 | 7/1946 | Roberts et al. | 192—3.29 |
| 2,621,769 | 12/1952 | Cardwell et al. | |
| 2,894,609 | 7/1959 | Tattersall | 192—3.3 |
| 2,929,270 | 3/1960 | Tuck et al. | |

FOREIGN PATENTS 971,639  9/1964  Great Britain.

BENJAMIN W. WYCHE III, Primary Examiner

192—88, 105